United States Patent [19]

Shumway

[11] 4,048,614
[45] Sept. 13, 1977

[54] LOW TIRE PRESSURE WARNING DEVICE

[76] Inventor: Harry J. Shumway, Clark Road, Naugatuck, Conn. 06770

[21] Appl. No.: 757,052

[22] Filed: Jan. 5, 1977

[51] Int. Cl.$^2$ .......................................... B60C 23/04
[52] U.S. Cl. .................................... 340/58; 200/61.25
[58] Field of Search ............... 340/58, 224; 200/61.22, 200/61.25, 61.26

[56] References Cited

U.S. PATENT DOCUMENTS 3,810,090   5/1974   Davis, Jr. et al. ...................... 340/58

*Primary Examiner*—Alvin H. Waring
*Attorney, Agent, or Firm*—DeLio and Montgomery

[57] ABSTRACT

A pressure detector and radio transmitter component of a tire pressure warning system for a wheeled vehicle, with the component being associated with a tubeless vehicle tire by being mounted on the wheel rim on which the tire is mounted so that the component is wholly located in the sealed space formed by the interior of the tubeless tire and the wheel rim on which the tire is mounted.

6 Claims, 5 Drawing Figures

LOW TIRE PRESSURE WARNING DEVICE

This invention relates to a low tire pressure warning device for alerting the operator of a wheeled vehicle to a potentially hazardous condition of any of the vehicle tires when the air pressure therein drops below a set minimum operating pressure.

The invention is concerned with the type of warning device or system which provides a tire pressure detector and associated radio transmitter component mounted on each vehicle wheel, and a radio receiver and alarm component in the vehicle, of which any detector responds to below-minimum operating pressure in the associated vehicle tire to trigger the associated transmitter into generating a radio signal and sending it wireless to the receiver in the vehicle to activate the alarm and thereby warn the operator of the below-minimum pressure condition in a vehicle tire. Different prior warning systems of this type are known, but according to best information available none of these prior systems is or has been in use on any commercial scale and this is due primarily to their lack of reliability in operation especially after some time in service. Thus, the detector and transmitter components of these prior systems are mounted on the wheels invariably on the outside thereof for their installation and also repair or replacement, and they are also shielded in different ways for their intended protection from extraneous foreign matter, yet for reasonably ready access to them for repair or replacement if need be. However, shielding the detector and transmitter components to these ends, whether achieved by separate cover parts or by special heavy-duty construction of these components, inherently lacks that tight block of any and all seepage paths for dirt and moisture from the outside of the vital operating parts of the components which would permit reasonably enduring reliable performance of the latter. Furthermore, such shielding of the detector and transmitter components falls short of keeping the vital operating parts thereof as totally non-exposed to the penetrating adverse effects of all kinds of weather as to preclude occasional malfunction or nonfunction of these components, and especially of the circuitry thereof, from this cause.

Heretofore it has also been impossible to set with precision the low pressure point at which the warning device triggers. Because of the orientation of prior art devices on the tire inflation valve, the switches thereof have generally been sensitive to the centrifugal forces generated by the rotating tire. Since the amount of the force, and the correction required therefor, depends on the rotational speed of the tire which can get quite large in today's high-speed driving, and the particular orientation of the device around the valve, it is impossible to easily correct for the centrifugal force.

It is among the objects of the present invention to provide for a wheeled vehicle a warning system of this type, of which each detector and transmitter component is mounted on a vehicle wheel, not on the outside thereof as heretofore, but rather in the sealed inner space in a mounted tubeless tire on the wheel rim, with the component being to this end mounted on the wheel rim and projecting into the interior of the mounted tire thereon. With this arrangement, the mounted tire performs the additional function of a shield for the component, with this shield as such not only entailing no cost whatsoever but, even far more important, affording the ultimate in enduring protection of the entire component, including its vital operating parts, from any and all dirt and moisture and from any adverse effects of the weather so that the component will remain properly functional for the longest time.

It is another object of the present invention to mount each detector and transmitter component of a warning system of this type on a vehicle wheel so as to be shielded by a mounted tubeless tire on the wheel rim as aforementioned, and to take advantage of the characteristic concave section of the wheel rim which forms on the wheel periphery an annular well or depression, by so mounting the detector and transmitter component on the wheel rim that the component is located wholly within this well. With this arrangement, the mounted detector and transmitter component is also protected in this wheel well from becoming crushed if the tire should be flat while rolling on the ground.

It is a further object of the present invention to mount each detector and transmitter component of a warning system of this type on a vehicle wheel so as to be shielded by a mounted tubeless tire on the wheel rim as aforementioned, by mounting the component on the wheel rim, not directly but rather through intermediation of a customary tire valve. With this arrangement, the entire detector and transmitter component may simply and conveniently be mounted, preferably removably, on the inner end of the tire valve which, except for this inner mounting end, may be entirely conventional and have the time-tested firm and leakproof mount on the wheel rim.

It is another object to provide a new and improved low pressure warning device substantially impervious to the centrifugal forces generated by the rotating tire, to allow the low pressure trigger point to be set with precision and confidence.

Further objects and advantages will appear to those skilled in the art from the following, considered in conjunction with the accompanying drawings.

In the accompanying drawings, in which certain modes of carrying out the present invention are shown for illustrative purposes:

Figure 2:
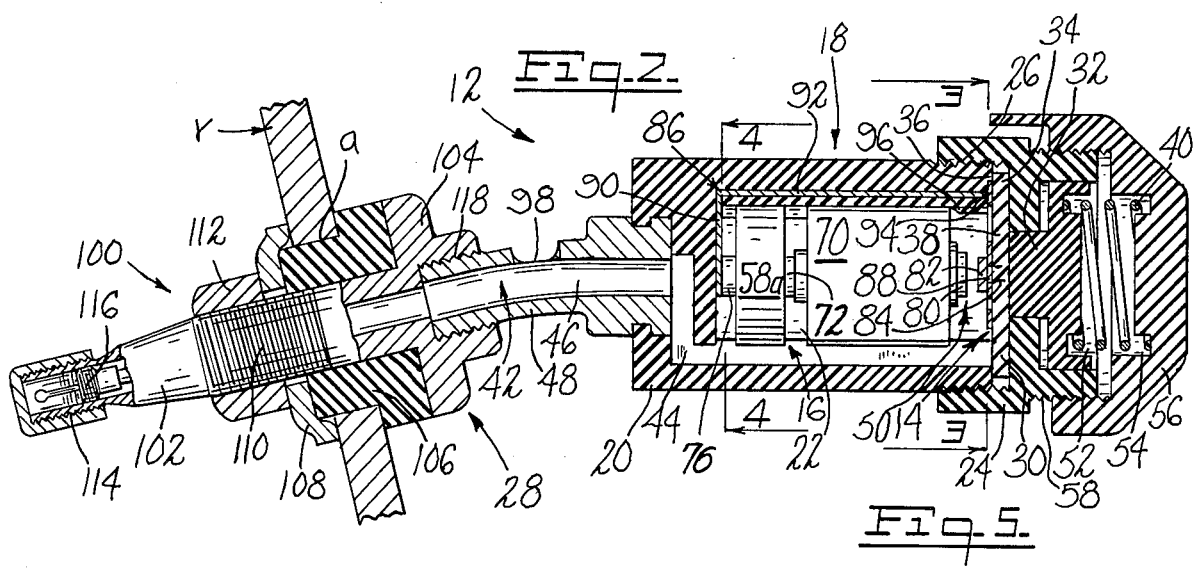
FIG. 2 is an enlarged longitudinal section through the mounted detector and transmitter component of FIG. 1.
Figure 3:
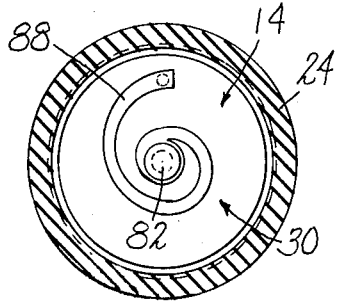
Figure 4:
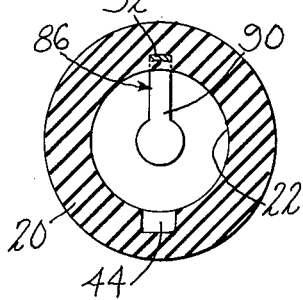
Figure 5:
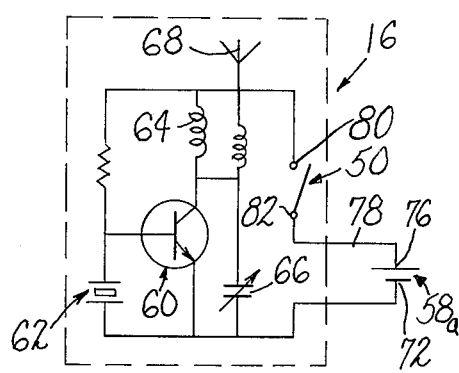

FIGS. 3 and 4 are cross-sections through the detector and transmitter component taken on the lines 3—3 and 4—4, respectively, of FIG. 2; and FIG. 5 is a diagram of the transmitter circuit.

Figure 1:
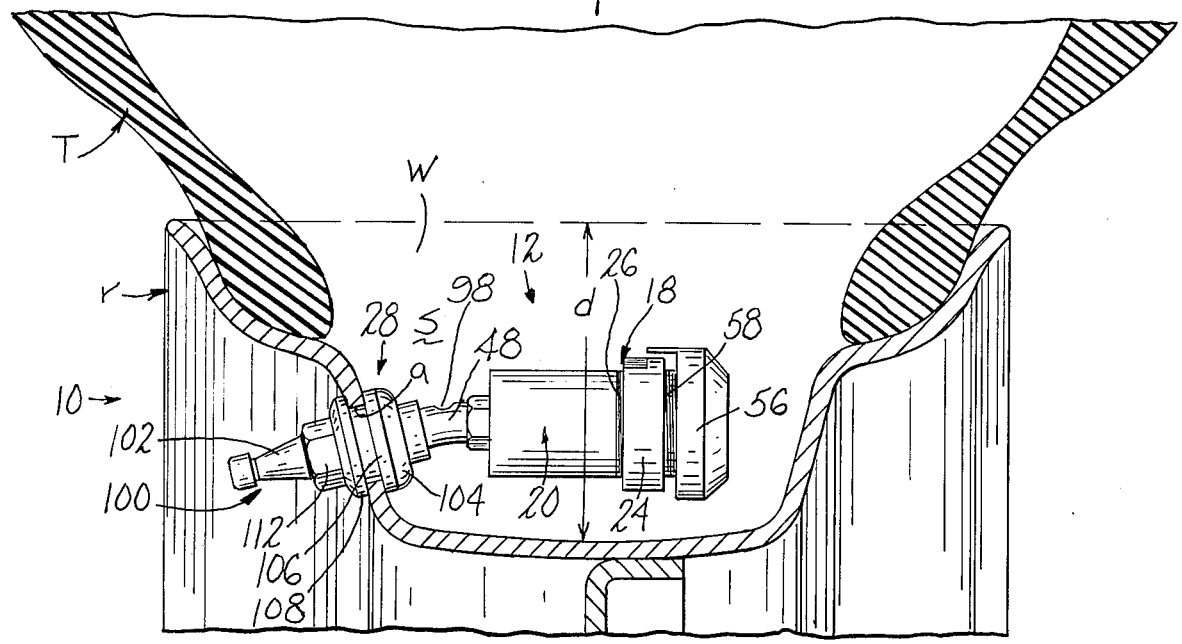
FIG. 1 is a fragmentary section through a wheel with a mounted detector and transmitter component of a warning system embodying the invention.

Referring to the drawings, and more particularly to FIG. 1 thereof, the reference numeral 10 designated one of several tire-shod wheels of a vehicle, such as a truck or an aircraft, for example, which is equipped with a tire pressure alarm system. This alarm system has operating components 12, preferably one for each vehicle wheel, with each operating component providing a tire pressure detector 14 and an associated radio transmitter 16, and the system further provides a radio receiver and associated alarm component (not shown) which is located in the vehicle and preferably serves for all operating components 12. With the alarm system in service, the detector 14 of any operating component 12 responds to air pressure below a preset minimum pressure in the associated vehicle tire to trigger the associated transmitter into generating a radio signal and sending it wireless to the receiver in the vehicle to activate the alarm and thereby warn the operator of the vehicle of the below-minimum pressure condition in a tire.

With all operating components being preferably identical, only the one shown in FIGS. 1 and 2 requires a detailed description for an understanding of all operating components. Thus, the component 12 there shown provides a housing 18 for the pressure detector 14 and associated radio transmitter 16, with the housing 18 being in this instance formed by a preferably molded plastic body 20 with a cylindrical recess 22, and a plastic end cover 24 over the open end of the recess 22, with the end cover 24 being in this instance screwed onto an externally threaded endlength 26 of the body 20. The housing 18 also has provisions 28 for its mount on the wheel 10 on which a tubeless tire T is mounted on the rim r thereof.

The tire pressure detector 14 has as its major operating part a diaphragm 30 of rubber or a like resilient material, and in this instance also a spring-urged plunger 32, of which the diaphragm 30 is with a peripheral margin 34 thereof clamped to the open end 36 of the body 20 by the end cover 24, so that a central portion 38 of the diaphragm is exposed to the recess 22 in the body 20, and the plunger 32 is by a spring 40 urged against the diaphragm 30 and tends to flex the central portion 38 of the latter into the adjacent end of the recess 22 in the body 20 against the pressure of air therein which is equal to the pressure of the air in the inflated tire T. To the latter end, the air in the inflated tire T is in permanent communication with the recess 22 in the body 20 through passage means 42, including a molded channel 44 in the body 20 and an aperture 46 in a metallic shank 48, with the shank 48 being in this instance molded in the body 20 and also forming part of the mounting provisions 28 for the housing 18. Shank 48 forms an elbow to situate operating component 12 in the well parallel to the axis of rotation of the wheel 10. For proper operation of the tire pressure detector 14, the force of the spring 40 against the plunger 32 is such that the latter will displace the exposed central portion 38 of the diaphragm 30 from seating engagement with the end cover 24 and flex it into the recess 22 in the body 20 only when the pressure of the air in the recess 22, and hence against the exposed diaphragm portion 38, is below a preset safe minimum air pressure. Thus, it is only on such operational flexure of the central diaphragm portion 38 into the recess 22 in the body 20 that the diaphragm closes a switch 50 of the associated radio transmitter 16 and thereby closes the transmitter circuit for generating a signal and sending it to the receiver in the vehicle to activate the alarm. The action spring 40 for the plunger 32 is suitably calibrated for presetting the safe minimum air pressure in the inflated tire T below which the spring will, through intermediation of the plunger 32, flex the diaphragm and close the switch 50 of the transmitter circuit to cause activation of the alarm in the vehicle and thereby warn the operator of the below-minimum air pressure in one of the tires. The action spring 40 for the plunger 32 is seated with its ends in recesses 52 and 54 in the end cover 24 and in an end cap 56 which is applied to the end cover 24. The end cap 56 is in this instance threadedly received at 58 on the end cover 24 for its manipulation to adjust the force of the action spring 40, and thereby also adjust the preset minimum air pressure in the inflated tire T below which the pressure detector 14 will trigger the associated radio transmitter 16 into generating a signal and sending it to the receiver in the vehicle for actuating the alarm.

The radio transmitter 16 provides a transmitter circuit (FIG. 5) which includes among its components a battery 58a, a transistor 60, a crystal 62, a coil 64, a tuning condenser 66, an antenna 68, and the beforementioned switch 50, with the antenna 68 emitting a radio frequency signal when the transmitter circuit is closed on closure of the switch 50. A number of the circuit components are conveniently provided in a casing 70 in the recess 22 in the body 20 of the housing 18 (FIG. 2), with the battery 58a being provided separately from the casing 70 and having one terminal 72 connected in the transmitter circuit through a contact 74 on the casing 70, and having its other terminal 76 connected through a lead 78 with the switch 50 (FIG. 5). The switch 50 is formed in this instance by two contacts 80 and 82 (FIG. 2), of which contact 80 is provided on the casing 70, and contact 82 is suitably carried by the diaphragm 30, preferably by having prongs 84 molded in the diaphragm. The connecting lead 78 between the battery terminal 76 and the switch 50 (FIG. 5) is formed by an L-shaped conductor 86 and a continuing spiral conductor 88 (FIGS. 2 to 4), of which one leg 90 of the conductor 86 is engaged by the battery terminal 76 (FIGS. 2 and 4) and the other leg 92 thereof is molded in the body 20 and has a contact point 94 at the open body end 36, while the ends of the spiral conductor 88 are in engagement with the contact point 94 of the conductor 86 and with the contact 82 of the switch 50 (FIGS. 2 and 3). The recess 22 in the body 20 is provided with a shallow wedge formation 96 past which the battery 58 and transmitter casing 70 are forced on their passage into the body through the open end 36 thereof, with the wedge formation 96 serving to lock the battery and transmitter casing 70 in place in the recess 22 on clearing the wedge formation (FIG. 2).

In accordance with an important aspect of the invention, the operating component 12 is mounted on the wheel 10 so as to be located in the sealed space S which is formed by the interior of the tubeless tire T and the wheel rim r on which the tire is mounted. To this end, the operating component 12 is, by its mounting provisions 28, secured to the wheel rim r so as to project therefrom into the sealed space S. With the operating component 12 being thus totally located in the sealed space S, the beforementioned passage means 42 between the interior of the mounted tire T and the recess 22 in the body 20 of the housing 18 provides, in addition to the aperture 46 in the shank 48 and the channel 44 in the body 20, merely a port hole 98 in the shank 48. Further, with the wheel rim r being of characteristic section to form a peripheral well w of some radial depth d (FIG. 1), the operating component 12 is mounted on the wheel rim r so as to be located preferably and advantageously in this well w entirely within its depth d, so that in the event the wheel should roll on the ground with its tire flat, the component 12 will not be crushed but remain protected by the wheel rim.

In accordance with another important aspect of the invention, the operating component 12 is preferably and advantageously carried by an inflation valve 100 for a tubeless tire. The inflation valve 100 provides a hollow stem 102 which extends through an aperture a in the wheel rim r and has an end collar 104 in the peripheral well w of the wheel. Surrounding the stem 102 and also extending through the aperture a in the wheel rim r is a compression ring 106 of neoprene or a like resilient material, with this ring 106 being at its opposite ends flanked by the end collar 104 and a washer 108. The stem 102 is externally threaded at 110 for the reception of a clamping nut 112 which, on being tightened, compresses the ring 106 between the end collar 104 and washer 108 and thereby forces the ring also into tight engagement with the aperture *a* in the wheel rim *r* to complete the firm mount of the tire valve on the wheel rim. The outer end of the stem 102 is internally threaded at 114 for the reception of the customary check valve 116. The operating component 12 is carried by the tire inflation valve 100 by having its shank 48 threadedly received at 118 in the end collar 104 on the stem 102, with the aperture 46 in the shank 48 being in communication with the hollow stem 102. Shank 48 comprises an elbow adapted to position the axis of component 12 parallel to the axis of rotation of the wheel, so as to eliminate the centrifugal force on the switch caused by its aforesaid rotation. The actual angle subtended by the elbow depends on the shape of the tire and the disposition of the inflation valve 100. The check valve is of conventional construction and performance, opening to admit compressed air into the tire T, but normally closed to block the escape of air from the tire. In thus arranging for carrying the operating component 12 on the tire inflation valve 100, the component 12 is mounted on the wheel 10 advantageously through intermediation of this valve 100.

What is claimed is:

1. A tire pressure alarm system for a vehicle having a wheel with a rim forming an annular well of a predetermined depth, said rim being adapted to receive a tire to form therewith an airtight chamber, said rim having an air inlet valve having a first end outside said airtight chamber and a second end inside said airtight chamber, said alarm system including an elongated operative component adapted to be removably connected to said second end and located entirely within said airtight chamber, so that the elongated direction of said operative component is substantially parallel to the axis of rotation of said wheel, said operative component including an air chamber adapted to receive air from said airtight chamber, said operative component further including an actuable radio transmitter and power source therefor situated within the air chamber, and a switch and diaphragm means, said switch being situated along said elongated direction so as to be substantially impervious to centrifugal force due to rotation of said wheel, said switch and diaphragm means being responsive to the air pressure in said air chamber to close said switch to actuate said transmitter when said air pressure is at a predetermined low pressure.

2. An operative component as defined in claim 1 in which said switch includes two parallel plates having faces situated perpendicular to said elongated direction.

3. An operative component as defined in claim 1 in which said power source, said transmitter, said switch and said diaphragm are positioned serially within said air chamber along the elongated direction.

4. An operative component as defined in claim 1 in which one side of said air chamber is easily removable to permit access to said power source, said transmitter, said switch and said diaphragm.

5. An operative component as defined in claim 1 further including means adjustable from outside said operative component for adjusting said predetermined low pressure.

6. An operative component as defined in claim 1 in which said operative component is connected to said second end by means of a screw thread.

* * * * *

UNITED STATES PATENT AND TRADEMARK OFFICE
CERTIFICATE OF CORRECTION

PATENT NO. : 4,048,614
DATED : September 13, 1977
INVENTOR(S) : Harry J. Shumway It is certified that error appears in the above-identified patent and that said Letters Patent are hereby corrected as shown below:

Column 1, preceding the first paragraph, add -- This application is a continuation-in-part of application Serial No. 605,337, filed August 18, 1975, now abandoned. --

Column 4, line 32, number "58" should be -- 58a --.

Signed and Sealed this

Seventeenth Day of January 1978

[SEAL]

Attest:

RUTH C. MASON
Attesting Officer

LUTRELLE F. PARKER
Acting Commissioner of Patents and Trademarks